June 25, 1940.  P. v. DOEPP  2,205,714
BRAKE FOR AIRCRAFT
Filed June 29, 1934
Fig. 1
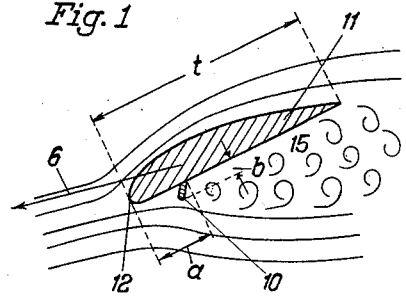
Fig. 2
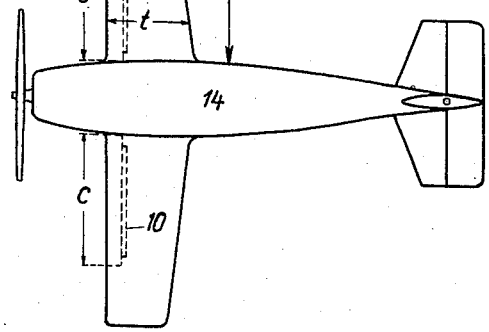
Fig. 3
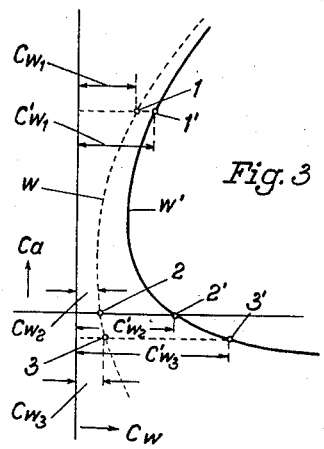
Fig. 6
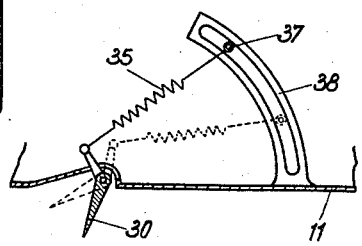
Fig. 4
Fig. 7
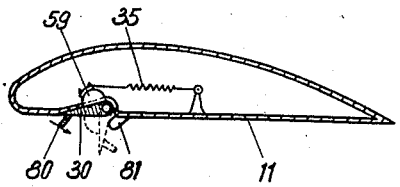
Fig. 5
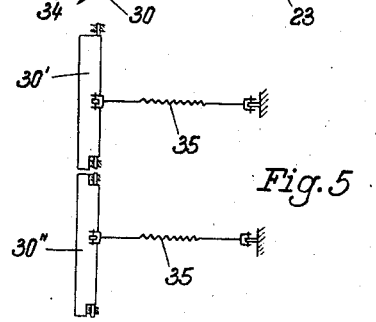
Inventor:
Philipp von Doepp
by Karl Michaelis Atty.

Patented June 25, 1940

2,205,714

UNITED STATES PATENT OFFICE 2,205,714

BRAKE FOR AIRCRAFT

Philipp v. Doepp, Dessau, Germany, assignor to Junkers Flugzeug-und-Motorenwerke Aktiengesellschaft, Dessau, Germany Application June 29, 1934, Serial No. 733,136
In Germany July 3, 1933

6 Claims. (Cl. 244—113)

My invention relates to means for braking aircraft and quite especially flying machines. It relates more particularly to brakes thrown in by the relative wind. Brakes of this kind, when stricken by the relative wind during flight, create a resistance to propulsion which exerts a braking action on the craft.

Brakes of this kind as heretofore suggested comprise pivotally arranged baffles or the like attached to the body or to the empennage of the craft. In order that a powerful braking action may be obtained, large baffles must be provided which require considerable space and thus create difficulties of construction. They further require considerable forces for adjustment in view of the great wind pressure acting thereon.

It is an object of my invention to provide a brake of this kind which is particularly adapted to considerably reduce the speed of the craft during a steep descent and the dimensions of which are nevertheless relatively small, so that the brake may be easily accommodated in the craft and requires only little energy for adjustment, so that if desired automatic adjusting means may be provided which may for instance be actuated in dependency on the speed of the craft or the impact pressure.

In a flying machine embodying my invention an adjustable ledge, vane or the like is arranged at the underside of the wing and preferably near the front edge thereof being for instance spaced from this edge not more than 40% of the chord length of the wing, a ledge of this kind being provided on each side of the axis of symmetry and extending transversely to the direction of flight across a considerable part of the span of the wing. The ledges are hingedly connected to the wing in such manner, that in the inoperative position the axes about which they can be rocked, are located close to their trailing edges. During normal flight this ledge or these ledges are lying flush against the underside of the wing. If the craft changes to a dive, there will be created at the lower frontal part of the wing a low-pressure area, which tends to rock the ledge or ledges into operative position, so that only a comparatively small additional force need be applied for actually rocking the ledges into operative position whenever a braking effect is desired. Due to the fact that the ledges are arranged in such a manner that, while rocking them into operative position, they will project forward and downward from the underside of the wing, they will very efficiently deflect the air current, even if they are only swung out of their inoperative position to a comparatively small extent. The deflection of the air will create a low pressure area acting on the underside of the wing to the rear of the ledges thereby creating a braking effect. It should be understood, that this braking effect is chiefly due to the deflection of the air current and to the resulting low pressure area to the rear of the ledges. The direct action exerted on the ledge or ledges by the relative wind represents only a small portion of the braking effect. This means that here the ledge itself does not act mainly as a braking surface, but only as a means for starting the braking action. In consequence thereof a powerful braking action is already obtained with a ledge the operating edge of which projects from the underside of the wing only very little, say not more than 6% of the chord length of the wing. Thus the air forces acting upon the ledge are relatively small, as is also the strain exerted on the ledge and its supports and the forces required for adjusting it. However, since the ledge should influence the air current along a large portion of the underside of the wing, it must extend over a considerable part of the span, at least over about one half of the span.

The braking action of the ledge is particularly powerful when the angle of incidence of the wing is considerably smaller than during normal flight, this being the case for instance when the lift of the wing is very low or even negative, as at steep descents. At normal flight, however, the disturbance caused by the ledge in its operative position is relatively small. This involves the advantage that it does not matter if by inadvertence the ledge should not be returned into inoperative position at normal flight or if in its inoperative position the ledge should slightly project below the underside of the wing.

The ledge may either be adjusted by the pilot or automatically in dependency upon the speed or the impact pressure. In aircraft with automatic adjustment of the ledges means may be provided for changing at will the dependency of the adjustment of the ledge from the speed or impact pressure. If desired, means may further be provided for keeping the adjusting forces to be exerted by the pilot or by the automatic adjusting means particularly low. In hand-operated braking devices means are preferably provided for continuously increasing the braking action by gradually advancing the ledge into the air current, these means being so designed that the force to be exerted by the pilot substantially corresponds to the braking effect so that the pilot may judge the braking effect from the force he has to apply to the adjusting device. In adjusting devices which are operated automatically, for instance through the impact pressure, means are preferably provided for continuously increasing the braking action in proportion as the impact pressure increases, in order to avoid the crew or passengers being exposed to the consequences of sudden changes of velocity.

In the drawing affixed to this specification and forming part thereof some embodiments of my invention are illustrated diagrammatically by way of example.

In the drawing

Fig. 1 is a cross-section of a wing of an aeroplane provided with a ledge according to my invention, the air current being indicated in this figure in order to explain the braking action.

Fig. 2 is a plan view of an aeroplane equipped with braking means according to Fig. 1.

Fig. 3 is a diagram illustrating the forces exerted on the wings.

Fig. 4 shows another modification of the braking device.

Fig. 5 illustrates a braking ledge subdivided into two sections.

Fig. 6 is a diagrammatic illustration of still another modification, and

Fig. 7 is a cross section of a wing and braking ledge with spring controlled cam means for holding the ledge in inoperative position, an auxiliary plane serving to force the ledge into operative position under the action of the relative wind.

Referring first to Fig. 1, 11 is a wing or supporting plane of an aeroplane, from the underside of which projects a ledge 10 which may be adjusted as more fully described hereinafter in connection with Fig. 4 et sequ. The ledge is shown in its operative position, in which the distance $a$ between the ledge and the front edge of the wing does not exceed 40% of the chord length $t$, while the distance $b$ between the lower edge of the ledge and the underside of the wing does not exceed about 6% of the chord length $t$. The length $c$ of the ledge 10 is shown in Fig. 2, in which 14 is the fuselage and 11 are the wings, each provided at its underside with a ledge 10 indicated by dotted lines. The length $c$ of each ledge is here shown as slightly exceeding one half of the span $d$ of the wing 11. However, if desired, the ledges may also extend over the entire span of the wings. Suitable adjusting means (not shown) may be provided for the ledges. Preferably the ledges are coupled with each other, in order to enable them to be adjusted by a common adjusting device.

The operation of the ledges 10 shown in Figs. 1 and 2 is as follows:

During a steep descent the wing 11 is in a position (shown in Fig. 1) in which the angle of incidence is strongly negative. The arrow 6 indicates the direction of flight and the air current in the neighbourhood of the wing 11 is illustrated by the lines $s$. The air flowing along the underside of the wing 11 is deflected by the ledge 10, a low-pressure area 15 being formed to the rear of the ledge. This low-pressure area brings about a marked increase of the air resistance presented to the wing, so that a braking effect is exerted on the aeroplane, without however the equilibrium of the momenta with respect to the transversal axis of the aeroplane being materially disturbed.

The large increase of air resistance is shown with particular clearness in the diagram of Fig. 3 in which the abscissae $C_w$ denote the air resistance, the ordinates $C_a$ the lift. The curve $w$ shown in dotted lines indicates the connection between the air resistance and the lift when the ledge is in its inoperative position or if no ledge is provided at all. The curve $w'$ drawn in full line indicates the corresponding function of an aeroplane, in which the ledge is in its operative position. At normal flying positions, indicated by the points 1 and 1', when the lift is relatively high, the resistances $C_{w1}$ and $C'_{w1}$ are relatively small and do not considerably differ from each other. This shows that it does not matter much whether at normal flying positions the ledge is in its operative or in its inoperative position. However this does not apply to small and negative angles of inclination. The points 2 and 2' indicate positions at which the lift is equal to zero. Fig. 3 shows that in these positions the resistance $C'_{w2}$ of the aeroplane with the ledge in operative position is a multiple of the resistance $C_{w2}$ of the aeroplane with the ledge in its inoperative position. This difference is still increased for negative angles of inclination, a position of this kind being indicated in Fig. 3 by the points 3 and 3', the corresponding resistances being $C_{w3}$ and $C'_{w3}$. It will thus be seen that this braking device is particularly effective for small and negative lifts.

As stated before, the ledge is preferably made adjustable and some preferred embodiments thereof are shown in the following figures.

In the embodiment shown in Fig. 4 the adjusting device for the baffle-shaped ledge 30 comprises an actuating rod 23 pivoted to an extension 34 secured to the ledge 30. In order to reduce the force required for adjusting the baffle 30, a tension spring 35 is connected to the extension 34 and to a stationary adjusting point 36, respectively. The tension of the spring 35 is so chosen that it approximately counter-balances the air force acting upon the baffle 30. In order to more closely adapt the tension of the spring to the change of the air forces in the various positions of the baffle, the spring may be connected to the baffle by means of a suitably shaped cam disc.

If desired, the ledge may be subdivided into a plurality of sections arranged in alignment with each other and provided with separate adjusting means. An embodiment of such a subdivided ledge is shown in Fig. 5, the ledge here comprising two sections 30' and 30'', each of which is provided with a separate compensating spring 35. By actuating a smaller or larger number of sections, the braking action may be suitably varied. If desired, the tensions of the springs 35 may differ from each other.

In the embodiment shown in Fig. 6 the spring 35 counter-balancing the air forces exerted on the baffle 30 is attached with its one end to a member 37 slidably arranged in a suitably curved stationary guide 38. When the baffle 30 is adjusted by means of an actuating lever (not shown) or the like, the attaching member 37 is correspondingly displaced, for instance by suitably connecting it to the adjusting lever, so that the tension of the spring 35 is held substantially constant. If desired, however, the tension of the spring may be varied during the adjustment of the baffle by suitably curving the guiding member 38 corresponding to the change of the air forces in dependency on the position of the baffle.

In Fig. 7 the baffle-shaped ledge 30 is held in inoperative position by a spring 35 acting upon the baffle by means of a cam disc 59. In order to automatically release the ledge, a small auxiliary plane 80 is rigidly secured to the ledge in such manner that it projects from the underside of the wing 11 even when the ledge is in its inoperative position. At normal speed the air force exerted on the auxiliary plane 80 does not suffice to overcome the tension of the spring 35. However, when the speed increases, the air force exerted on the auxiliary plane 80 will overcome the tension of the spring 35 and will force the ledge 30 into its operative position shown in dotted lines. 81 is a stop for limiting the movement of the ledge. In order to return the ledge to its inoperative position at will, an actuating rod (not shown) may be provided. In any event the ledge is returned to its inoperative position by means of the spring 35 when the air forces acting upon the auxiliary plane 80 are sufficiently reduced, for instance when the aeroplane is landing. If desired, the ledge 30 may be subdivided into sections, each section being provided with a separate spring 35.

I wish it to be understood that I do not desire to be limited to the exact details of construction shown and described for obvious modifications will occur to a person skilled in the art.

I claim:

1. In aircraft in combination, a supporting plane including a skin having a substantially unbroken bottom surface, a vane extending below and substantially in parallel relation to said bottom surface, means for rocking said vane into the air space below said plane by angular movement about an axis extending near the trailing edge of said vane, said vane being spaced from the front edge of the plane by a distance not exceeding forty per cent of the chort length of said plane, means connected to said vane and acting in response to an increase of dynamic air pressure on said means to move the vane to operative position, and means for balancing part of the force acting on said vane-moving means.

2. In aircraft in combination, a supporting plane including a skin having a substantially unbroken bottom surface, a vane extending below and substantially in parallel relation to said bottom surface, means for rocking said vane into the air space below said plane by angular movement about an axis extending near the trailing edge of said vane, said vane being spaced from the front edge of the plane by a distance not exceeding forty per cent of the chord length of said plane, means connected to said vane and acting in response to an increase of dynamic air pressure on said means to move the vane to operative position, and means for balancing part of the dynamic air pressure acting on said vane.

3. In aircraft in combination, a supporting plane including a skin having a substantially unbroken bottom surface, a vane extending below and substantially in parallel relation to said bottom surface, means for rocking said vane into the air space below said plane by angular movement about an axis extending near the trailing edge of said vane, said vane being spaced from the front edge of the plane by a distance not exceeding forty per cent of the chord length of said plane, means connected to said vane and acting in response to an increase of dynamic air pressure on said means to move the vane to operative position, and a spring acting on said vane counter to the air pressure.

4. In aircraft in combination, a supporting plane including a skin having a substantially unbroken bottom surface, a vane extending below and substantially in parallel relation to said bottom surface, means for rocking said vane into the air space below said plane by angular movement about an axis extending near the trailing edge of said vane, said vane being spaced from the front edge of the plane by a distance not exceeding forty per cent of the chord length of said plane, means connected to said vane and acting in response to an increase of dynamic air pressure on said means to move the vane into operative position, a spring acting on said vane counter to the air pressure, and means for varying the tension of said spring.

5. In combination with an aircraft supporting wing, a diving brake extending along the under surface thereof substantially transversely to the direction of flight and spaced from the leading edge of the wing a distance not exceeding 40% of the wing chord, said brake comprising a relatively narrow strip of a length not less than one-half the wing span positioned for movement with reference to the wing in a direction transverse to the plane thereof, means for mounting said brake on said wing, means for moving said strip outwardly away from the under surface of said wing, said means for mounting said brake and said means for moving said brake strip being so constructed and arranged that said strip when extended forms with the under surface of the wing a forwardly opening acute angle therewith whereby the strip cuts the passing air stream, and positively acting means for limiting to about 6% of the wing chord the distance perpendicularly from the under surface of the wing to the outer edge of the strip whereby no practically effective frontal resistance obtains.

6. In combination with an aircraft supporting wing, a diving brake extending along the under surface thereof substantially transversely to the direction of flight and spaced from the leading edge of the wing a distance not exceeding 40% of the wing chord, said brake comprising a relatively narrow strip of a length not less than one-half the wing span, means for mounting said brake on said wing for pivotal movement in a direction transverse to the plane thereof and about its trailing edge as an axis, means for moving the leading edge of said strip outwardly away from the under surface of said wing, said means for mounting said brake and said means for moving said brake strip being so constructed and arranged that said strip when extended forms with the under surface of the wing a forwardly opening acute angle therewith whereby the strip cuts the passing air stream, and positively acting means for limiting to about 6% of the wing chord the distance perpendicularly from the under surface of the wing to the outer edge of the strip whereby no practically effective frontal resistance obtains.

PHILIPP v. DOEPP.